United States Patent [19]

Jeong

[11] Patent Number: 5,621,437

[45] Date of Patent: Apr. 15, 1997

[54] DATA INPUT/OUTPUT CONTROL UNIT FOR TOUCH PANEL INTERFACE DEVICE

[75] Inventor: Hae D. Jeong, Seoul, Rep. of Korea

[73] Assignee: LG Electronics Inc., Rep. of Korea

[21] Appl. No.: 498,465

[22] Filed: Jul. 5, 1995

[30] Foreign Application Priority Data

Oct. 7, 1994 [KR] Rep. of Korea .................. 25731/1994
Nov. 30, 1994 [KR] Rep. of Korea .................. 31924/1994

[51] Int. Cl.$^6$ ..................................................... G09G 5/00
[52] U.S. Cl. ............................................. 345/173; 345/211
[58] Field of Search ............................ 345/173, 104, 345/174, 175, 177, 211, 212

[56] References Cited

PUBLICATIONS

IBM Technical Disclosure Bulletin "Cursor Controller/Graphics Pad", Feb. 1986, pp. 4093–4096.

*Primary Examiner*—Richard Hjerpe
*Assistant Examiner*—Regina Liang

[57] ABSTRACT

A data input/output control unit for a touch panel interface device, comprising a touch panel for sensing coordinates of a point touched by a user's pen and generating an analog signal in accordance with the sensed result, a data detector for detecting input data to the touch panel, a control circuit for controlling a system operation in response to an output signal from the data detector, a switch for turning on/off supply power to the touch panel in response to a first control signal from the control circuit, an analog/digital converter for converting the analog signal from the touch panel into digital data in response to a second control signal from the control circuit and outputting the converted digital data to the control circuit, and a serial communication circuit for performing a serial communication with other systems in response to a third control signal from the control circuit.

14 Claims, 3 Drawing Sheets

DATA INPUT/OUTPUT CONTROL UNIT FOR TOUCH PANEL INTERFACE DEVICE

BACKGROUND OF THE INVENTION

1. Field of the Invention

The present invention relates in general to a touch panel interface device, and more particularly to a data input/output control unit for the touch panel interface device in which a system control part is designed with a digital logic circuit for use in a portable system, and a present mode is changed to a suspend mode after the lapse of a predetermined time period from the moment that no data is applied to a touch panel, to turn off supply power to the touch panel and stop a system operation, so that power consumption can be minimized and a battery can be lengthened in life, in particular in small, portable equipments such as a personal digitizer assistant (referred to hereinafter as PDA) and the like.

2. Description of the Prior Art

Referring to FIG. 1, there is shown a schematic block diagram of a conventional touch panel interface device. As shown in this drawing, the conventional touch panel interface device comprises a touch panel 1 for sensing coordinates of a point touched by a user's pen and generating an analog signal in accordance with the sensed result, a read only memory (referred to hereinafter as ROM) 5 for storing a control program for controlling a system operation, a micro controller 4 for executing the control program stored in the ROM 5 to control the system operation, an analog/digital (referred to hereinafter as A/D) converter 2 for converting the analog signal from the touch panel 1 into digital data in response to a control signal CS10 from the micro controller 4 and outputting the converted digital data to the micro controller 4, a switch 3 for turning on/off supply power to the touch panel 1 in response to a control signal CS20 from the micro controller 4, and a serial communication circuit 6 for performing a serial communication with other systems in an RS-232 manner in response to a control signal CS30 from the micro controller 4.

The operation of the conventional touch panel interface device with the above-mentioned construction will hereinafter be described with reference to FIG. 1.

Upon power-on, the micro controller 4 outputs the control signal CS10 to the A/D converter 2 according to the control program stored in the ROM 5 to sense input data.

If no data is sensed, the micro controller 4 outputs the control signal CS20 to the switch 3 to turn off the supply power to the touch panel 1.

In the case where data is applied to the touch panel 1 by the user's pen, the corresponding coordinates are sensed by the touch panel 1. Then, the touch panel 1 outputs the analog signal corresponding to the sensed coordinates to the A/D converter 2, which converts the analog signal into the digital data in response to the control signal CS10 from the micro controller 4 and outputs the converted digital data to the micro controller 4. Then, the micro controller 4 stores the digital data from the A/D converter 2 into a random access memory (referred to hereinafter as RAM), not shown.

The micro controller 4 transfers the data stored in the RAM and the control signal CS30 to the serial communication circuit 6 to perform data transmission and reception with other systems. The serial communication circuit 6 may include, for example, a universal asynchronous receiver/transmitter (UART). Then, the serial communication circuit 6 performs the serial communication with other systems in the RS-232 manner.

However, the above-mentioned conventional touch panel interface device has a disadvantage in that an internal structure cannot be known because the micro controller and the ROM are provided on a single application/specific integrated circuit (referred to hereinafter as ASIC) chip in a manufacturing process. For this reason, it is difficult to perform precision control for system implementation. Further, power consumption is increased because the power is always supplied to the other blocks and the micro controller scans the data input continuously by means of the A/D converter. This results in a reduction in life of a battery, particularly in small, portable equipments such as a PDA and the like.

SUMMARY OF THE INVENTION

Therefore, the present invention has been made in view of the above problem, and it is an object of the present invention to provide a data input/output control unit for a touch panel interface device in which a micro controller/ROM ASIC chip is designed with a digital logic circuit for use in a portable system, and a present mode is changed to a suspend mode after the lapse of a predetermined time period from the moment that no data is applied to a touch panel in order to turn off supply power to the touch panel and stop a system operation, so that power consumption can be minimized and a battery can be lengthened in life, in particular in small, portable equipments such as a PDA and the like.

In accordance with the present invention, the above and other objects can be accomplished by a provision of a data input/output control unit for a touch panel interface device. The data input/output control unit comprises a touch panel for sensing coordinates of a point touched by a user's pen and generating an analog signal in accordance with the sensed result; data detection means for detecting input data to the touch panel; system control means for controlling a system operation in response to an output signal from the data detection means; switching means for turning on/off supply power to the touch panel in response to a first control signal from the system control means; analog/digital conversion means for converting the analog signal from the touch panel into digital data in response to a second control signal from the system control means and outputting the converted digital data to the system control means; and serial communication means for performing a serial communication with other systems in response to a third control signal from the system control means.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

Figure 1:
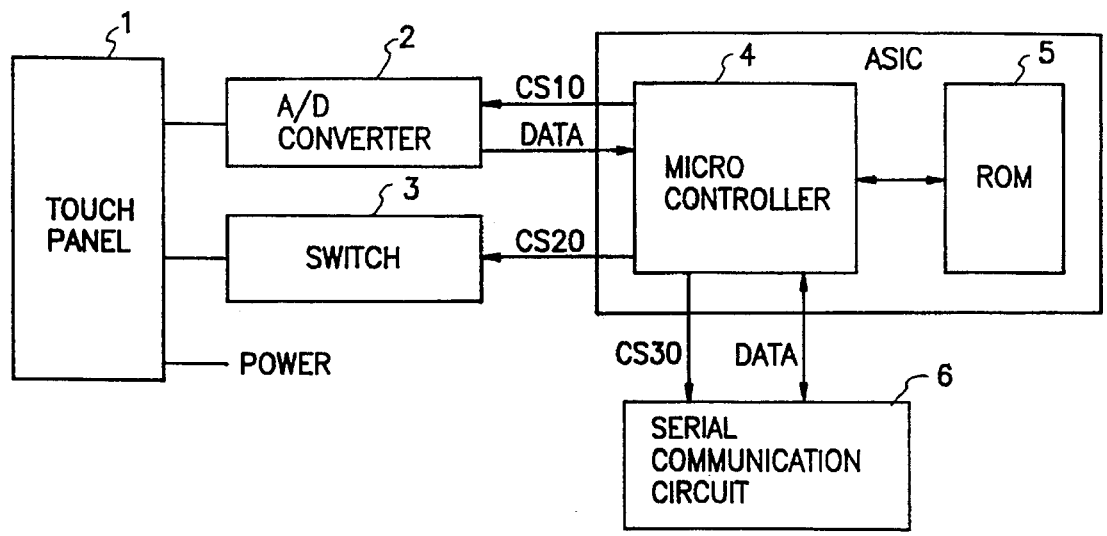
FIG. 1 is a schematic block diagram of a conventional touch panel interface device.
Figure 2:
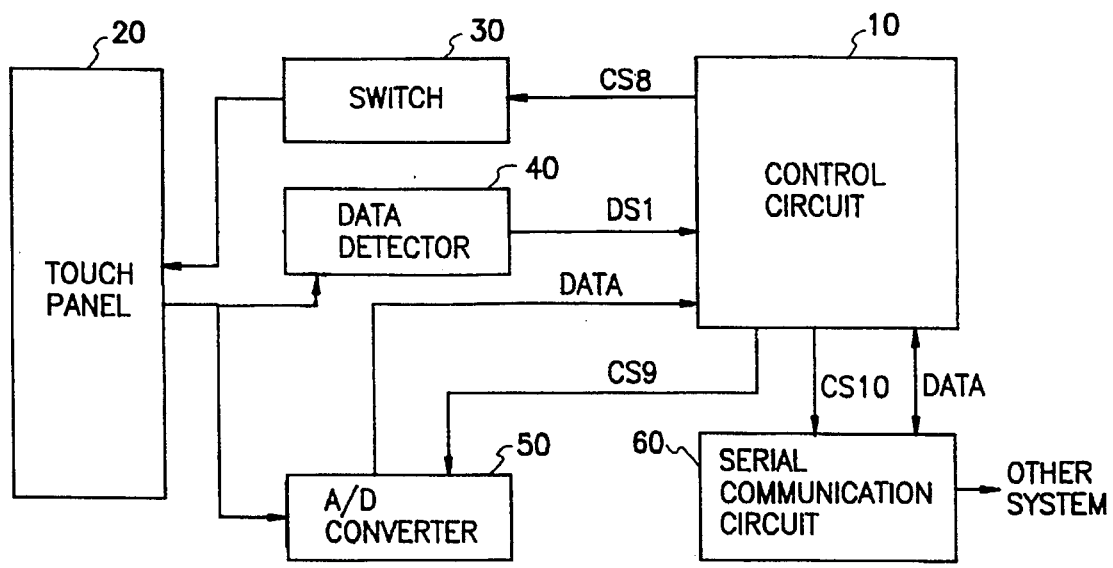
FIG. 2 is a schematic block diagram of a data input/output control unit for a touch panel interface device in accordance with the present invention.

Referring to FIG. 2, there is shown a schematic block diagram of a data input/output control unit for a touch panel interface device in accordance with the present invention. As shown in this drawing, the data input/output control unit comprises a touch panel 20 for sensing coordinates of a point touched by a user's pen and generating an analog signal in accordance with the sensed result, a data detector 40 for detecting the presence of analog signals output from the touch panel 20 in response to touch input thereto to the touch panel and outputting a detect signal DS1 in accordance with the detected result, a control circuit 10 for controlling a system operation in response to the detect signal DS1 from the data detector 40, and a switch 30 for turning on/off supply power to the touch panel 20 in response to a control signal CS8 from the control circuit 10.

The data input/output control unit further comprises an A/D converter 50 for converting the analog signal from the touch panel 20 into digital data in response to a control signal CS9 from the control circuit 10 and outputting the converted digital data to the control circuit 10, and a serial communication circuit 60 for performing a serial communication with other systems in response to a control signal CS11 from the control circuit 10.

Figure 3:
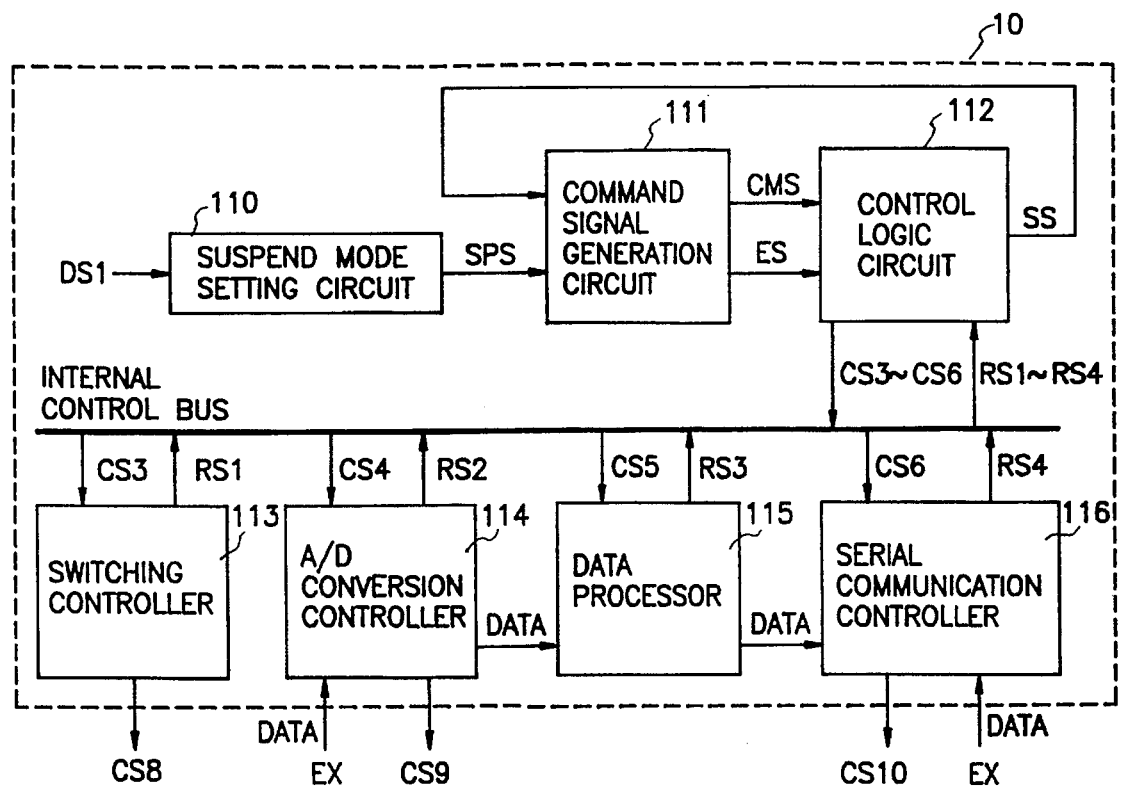
FIG. 3 is a detailed block diagram of the control circuit in FIG. 2.

Referring to FIG. 3, there is shown a detailed block diagram of the control circuit 10 in FIG. 2. As shown in this drawing, the control circuit 10 includes a suspend mode setting circuit 110 for generating a suspend signal SPS in response to the detect signal DS1 from the data detector 40 to change a present mode to a suspend mode (power saving mode), and a command signal generation circuit 111 for generating a command signal CMS in response to a status signal SS from a control lock circuit 112 (discussed below) and the suspend signal SPS from the suspend mode setting circuit 110 to control the system operation. The command signal generation circuit 111 also generates a status end signal ES upon its operation completion.

The control circuit 10 further includes a control logic circuit 112 for analyzing the command signal CMS from the command signal generation circuit 111 in response to the status end signal ES therefrom and outputting control signals CS3–CS6 as a result of the analysis through an internal control bus line. Also, the control logic circuit 112 inputs response signals RS1–RS4 through the internal control bus line and outputs the status signal SS to the command signal generation circuit 111 in response to the inputted response signals RS1–RS4.

The control circuit 10 further includes a switching controller 113 for outputting the control signal CS8 to the switch 30 in response to the control signal CS3 from the control logic circuit 112. The switching controller 113 also outputs the response signal RS1 to the control logic circuit 112 through the internal control bus line upon its operation completion.

The control circuit 10 further includes an A/D conversion controller 114 for outputting the control signal CS9 to the A/D converter 50 in response to the control signal CS4 from the control logic circuit 112 and inputting the digital data from the A/D converter 50. The A/D conversion controller 114 also outputs the response signal RS2 to the control logic circuit 112 through the internal control bus line upon its operation completion.

The control circuit 10 further includes a data processor 115 for processing output data from the A/D conversion controller 114 in response to the control signal CS5 from the control logic circuit 112 and outputting the response signal RS3 to the control logic circuit 112 through the internal control bus line upon its completion of operation, and a serial communication controller 116 for applying output data from the data processor 115 and the control signal CS10 (not shown) to the serial communication circuit 60 in response to the control signal CS6 from the control logic circuit 112. The serial communication controller 116 also outputs the response signal RS4 to the control logic circuit 112 through the internal control bus line upon its operation completion.

Figure 4:
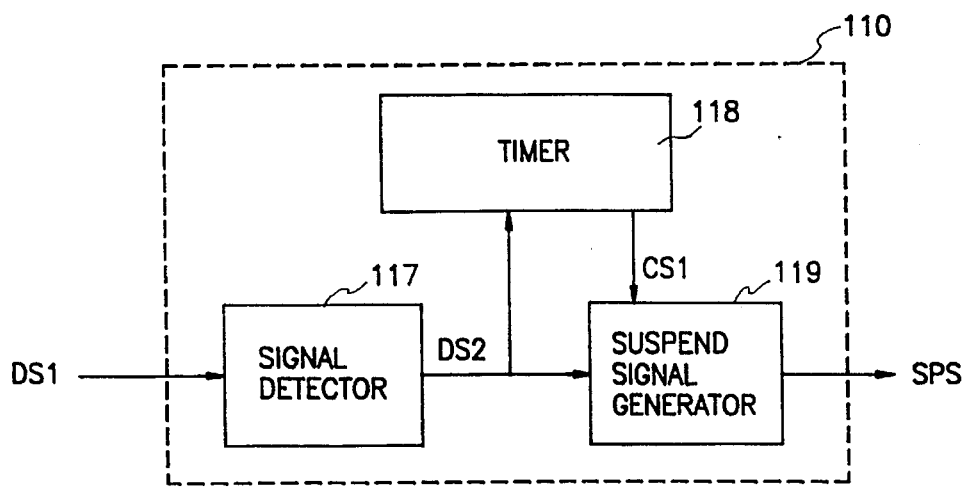
FIG. 4 is a detailed block diagram of the suspend mode setting circuit in FIG. 3.

Referring to FIG. 4, there is shown a detailed block diagram of the suspend mode setting circuit 110 in FIG. 3. As shown in this drawing, the suspend mode setting circuit 110 includes a signal detector 117 for detecting the detect signal DS1 from the data detector 40 and outputting a detect signal DS2 in accordance with the detected result, a timer 118 for counting the detect signal DS2 from the signal detector 117 for a predetermined time period and outputting a control signal CS1 in accordance with the counted result, and a suspend signal generator 119 for outputting the suspend signal SPS to the command signal generation circuit 111 in response to the control signal CS1 from the timer 118.

Figure 5:
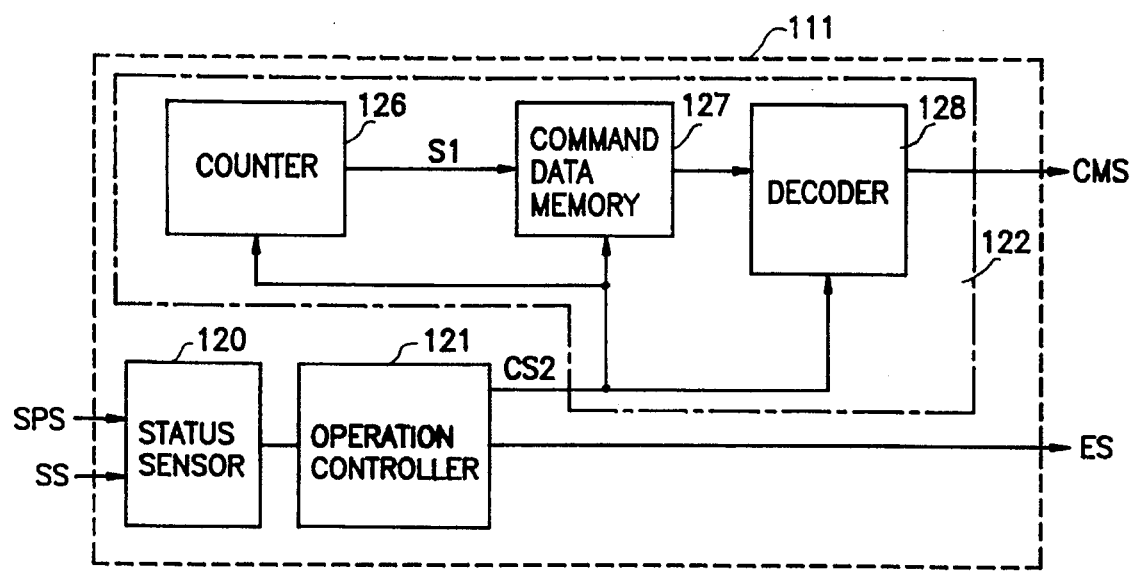
FIG. 5 is a detailed block diagram of the command signal generation circuit in FIG. 3.

Referring to FIG. 5, there is shown a detailed block diagram of the command signal generation circuit 111 in FIG. 3. As shown in this drawing, the command signal generation circuit 111 includes a status sensor 120 for sensing a present status in response to the status signal SS from the control logic circuit 112 and the suspend signal SPS from the suspend mode setting circuit 110, and an operation controller 121 for outputting an operation control signal CS2 in response to an output signal from the status sensor 120. The operation controller 121 also outputs the status end signal ES to the control logic circuit 112 upon its control operation completion.

The command signal generation circuit 111 further includes a command generator 122 for outputting the command signal CMS to the control logic circuit 112 in response to the operation control signal CS2 from the operation controller 121.

The command generator 122 includes a counter 126 for generating a table control signal S1 in response to the operation control signal CS2 from the operation controller 121, a command data memory 127 for storing command data in the form of a table and outputting the stored command data in response to the operation control signal CS2 from the operation controller 121 and the table control signal S1 from the counter 126, and a decoder 128 for decoding output data from the command data memory 127 in response to the operation control signal CS2 from the operation controller 121 and outputting the resultant command signal CMS to the control logic circuit 112.

Figure 6:
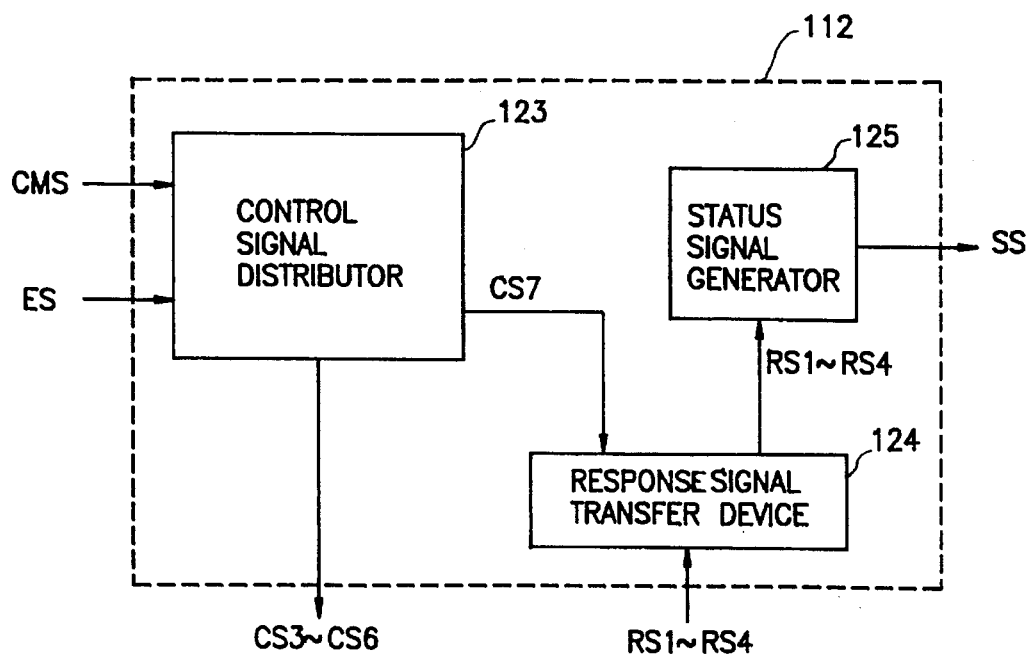
FIG. 6 is a detailed block diagram of the control logic circuit in FIG. 3.

Referring to FIG. 6, there is shown a detailed block diagram of the control logic circuit 112 in FIG. 3. As shown in this drawing, the control logic circuit 112 includes a control signal distributor 123 being enabled in response to the status end signal ES from the command signal generation circuit 111 to analyze the command signal CMS from the command signal generation circuit 111 and output the resultant control signals CS3–CS6 through the internal control bus line to the switching controller 113, the A/D conversion controller 114, the data processor 115 and the serial communication controller 116, respectively. The control signal distributor 123 also outputs a control signal CS7 upon its completion of operation.

The control logic circuit 112 further includes a response signal transfer device 124 being enabled in response to the control signal CS7 from the control signal distributor 123 to input the response signal RS1 from the switching controller 113, the response signal RS2 from the A/D conversion controller 114, the response signal RS3 from the data processor 115 and the response signal RS4 from the serial communication controller 116 through the internal control bus line and transfer the inputted response signals RS1–RS4.

The control logic circuit 112 further includes a status signal generator 125 for analyzing the response signals RS1–RS4 transferred by the response signal transfer device 124 and outputting the status signal SS to the command signal generation circuit 111 in accordance with the analyzed result.

The operation of the data input/output control unit for the touch panel interface device with the above-mentioned construction in accordance with the present invention will hereinafter be described in detail with reference to FIGS. 2 to 6.

When data is applied to the touch panel 20 by the user's pen, the corresponding coordinates are sensed by the touch panel 20. Then, the touch panel 20 outputs the analog signal corresponding to the sensed coordinates to the A/D converter 50. At this time, the data detector 40 outputs the detect signal DS1 to the control circuit 10.

In the suspend mode setting circuit 110 of the control circuit 10, the signal detector 117 detects the detect signal DS1 from the data detector 40 and outputs the resultant detect signal DS2 to the timer 118.

Upon receiving the detect signal DS2 from the signal detector 117, the timer 118 does not generate the control signal CS1, so that the suspend signal generator 119 does not generate the suspend signal SPS.

Such a status is sensed by the status sensor 120 in the command signal generation circuit 111. Then in the command signal generation circuit 111, the operation controller 121 generates the operation control signal CS2 in response to the sensed result from the status sensor 120. The operation control signal CS2 from the operation controller 121 is supplied to the command generator 122.

In the command generator 122, the counter 126 outputs the table control signal S1 to the command data memory 127 in response to the operation control signal CS2 from the operation controller 121. The command data memory 127 outputs the command data stored in the form of table therein to the decoder 128 in response to the operation control signal CS2 from the operation controller 121 and the table control signal S1 from the counter 126. The decoder 128 decodes the output data from the command data memory 127 in response to the operation control signal CS2 from the operation controller 121 and outputs the resultant command signal CMS to the control logic circuit 112.

The operation controller 121 then outputs the status end signal ES to the control logic circuit 112 at that time the control operation thereof is completed.

In the control logic circuit 112, the control signal distributor 123 is enabled in response to the status end signal ES from the command signal generation circuit 111. As being enabled, the control signal distributor 123 analyzes the command signal CMS from the command signal generation circuit 111 and outputs the resultant control signals CS3–CS6 through the internal control bus line to the switching controller 113, the A/D conversion controller 114, the data processor 115 and the serial communication controller 116, respectively.

Upon receiving the control signal CS3 from the control logic circuit 112, the switching controller 113 outputs the control signal CS8 to the switch 30 so that it can remain at its ON state. The control signal CS4 from the control logic circuit 112 enables the A/D conversion controller 114 to output the control signal CS9 to the A/D converter 50. In response to the control signal CS9 from the A/D conversion controller 114, the A/D converter 50 converts the analog signal from the touch panel 20 into the digital data and outputs the converted digital data to the A/D conversion controller 114, which then transfers the digital data from the A/D converter 50 to the data processor 115. The data processor 115 processes the transferred data from the A/D conversion controller 114 in response to the control signal CS5 from the control logic circuit 112 and outputs the processed data to the serial communication controller 116. The control signal CS6 from the control logic circuit 112 enables the serial communication controller 116 to apply the control signal CS10 and the output data from the data processor 115 to the serial communication circuit 60. In response to the control signal CS10 from the serial communication controller 116, the serial communication circuit 60 performs the serial communication with other systems in the RS-232 manner.

Then, the switching controller 113, the A/D conversion controller 114, the data processor 115 and the serial communication controller 116 output the response signals RS1–RS4 to the control logic circuit 112 through the internal control bus line at that time that operations thereof are completed.

In the control logic circuit 112, the control signal distributor 123 outputs the control signal CS7 to the response signal transfer device 124 at that time that the operation thereof is completed. The response signal transfer device 124 is enabled in response to the control signal CS7 from the control signal distributor 123. Upon receiving the response signal RS1 from the switching controller 113, the response signal RS2 from the A/D conversion controller 114, the response signal RS3 from the data processor 115 and the response signal RS4 from the serial communication controller 116 through the internal control bus line while being enabled, the response signal transfer device 124 transfers the inputted response signals RS1–RS4 to the status signal generator 125. Then, the status signal generator 125 analyzes the response signals RS1–RS4 transferred by the response signal transfer device 124 and outputs the status signal SS to the command signal generation circuit 111 in accordance with the analyzed result.

Subsequently, the above operation is continuously repeated in the same manner as that previously mentioned. Namely, the same command signal CMS from the command signal generation circuit 111 is applied to the control logic circuit 112, thereby causing the control logic circuit 112 to output the control signals CS3–CS6 through the internal control bus line to the switching controller 113, the A/D conversion controller 114, the data processor 115 and the serial communication controller 116, respectively. As a result, the input data to the touch panel 20 is transferred to the serial communication circuit 60 through the A/D converter 50, the A/D conversion controller 114, the data processor 115 and the serial communication controller 116. The serial communication circuit 60 performs the serial communication with other systems in the RS-232 manner.

In the case where the user temporarily stops the data input to the touch panel 20 during the above operation, the detect signal DS1 is not generated by the data detector 40, so that the detect signal DS2 is not generated by the signal detector 117 in the suspend mode setting circuit 110.

Then in the suspend mode setting circuit 110, the timer 118 outputs the control signal CS1 to the suspend signal generator 119 because it inputs no signal from the signal detector 117. As a result, the suspend signal generator 119 outputs the suspend signal SPS to the command signal generation circuit 111.

Upon the suspend signal SPS from the suspend mode setting circuit 110, the command signal generation circuit 111 generates the command signal CMS for changing the present mode to the suspend mode. Then, the command signal generation circuit 111 outputs the generated command signal CMS together with the status end signal ES to the control signal distributor 123 in the control logic circuit 112. Being enabled in response to the status end signal ES from the command signal generation circuit 111, the control signal distributor 123 analyzes the received command signal CMS and outputs the resultant control signal CS3 to the switch controller 113 through the internal control bus line to change the present mode to the suspend mode.

The switch controller 113 outputs the control signal CS8 to the switch 30 in response to the control signal CS3 from the control signal distributor 123, thereby causing the switch 30 to turn off the supply power to the touch panel 20. As a result, the A/D conversion controller 114, the data processor 115 and the serial communication controller 116 are stopped in operation, with the present mode changed to the suspend mode or the power saving mode.

Thereafter, when the user touches a desired portion of the touch panel 20 to resume the data input to the touch panel 20, the data detector 40 outputs the detect signal DS1 to the suspend mode setting circuit 110 in the control circuit 10 so that the suspend signal SPS cannot be generated. As a result, the suspend mode is released.

When the suspend signal SPS ceases, the corresponding status is sensed by the command signal generation circuit 111. Therefore, the above operation is repeated in the same manner as that previously mentioned. Namely, the command signal generation circuit 111 applies the command signal CMS and the status end signal ES to the control logic circuit 112.

Being enabled in response to the status end signal ES from the command signal generation circuit 111, the control signal distributor 123 in the control logic circuit 112 analyzes the received command signal CMS and outputs the resultant control signal CS3 to the switch controller 113 through the internal control bus line. The switch controller 113 outputs the control signal CS8 to the switch 30 in response to the control signal CS3 from the control signal distributor 123, thereby causing the switch 30 to turn on the supply power to the touch panel 20. As a result, the input data to the touch panel 20 is transferred to the serial communication circuit 60 through the A/D converter 50, the A/D conversion controller 114, the data processor 115 and the serial communication controller 116. As a result, the serial communication circuit 60 performs the serial communication with other systems in the RS-232 manner.

As apparent from the above description, according to the present invention, a micro controller/ROM ASIC chip is designed with a digital logic circuit for use in a portable system. Also, the present mode is changed to the suspend mode after the lapse of a predetermined time period from the moment that no data is applied to the touch panel, so as to turn off the supply power to the touch panel and stop the system operation. Therefore, power consumption can be minimized and a battery can be lengthened in life, particularly in small, portable equipments such as a PDA and the like.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A data input/output control unit for a touch panel interface device, comprising:

a touch panel for sensing coordinates of a point touched by a user's pen and generating an analog signal in accordance with the sensed result;

data detection means for detecting input data to said touch panel;

system control means for controlling a system operation in response to an output signal from said data detection means;

switching means for turning on/off supply power to said touch panel in response to a first control signal from said system control means;

analog/digital conversion means for converting the analog signal from said touch panel into digital data in response to a second control signal from said system control means and outputting said digital data to said system control means; and serial communication means for performing a serial communication with other systems in response to a third control signal from said system control means;

wherein said system control means includes:

suspend mode setting means for generating a suspend signal in response to the output signal from said data detection means to change a present mode to a suspend mode;

command signal generation means for generating a command signal in response to a status signal and the suspend signal from said suspend mode setting means to control the system operation;

control logic means for analyzing the command signal from said command signal generation means in response to a status end signal from said command signal generation means and outputting fourth to seventh control signals as a result of the analysis through an internal control bus line, said control logic means inputting first to fourth response signals through said internal control bus line and outputting the status signal to said command signal generation means in response thereto;

switching control means for outputting the first control signal to said switching means in response to the fourth control signal from said control logic means, said switching control means outputting the first response signal to said control logic means through said internal control bus line upon completion of operation of the switching means responsive to the first control signal;

analog/digital conversion control means for outputting the second control signal to said analog/digital conversion means in response to the fifth control signal from said control logic means and inputting the digital data from said analog/digital conversion means, said analog/digital conversion control means outputting the second response signal to said control logic means through said internal control bus line upon completion of operation of the switching means responsive to the first control signal;

data processing means for processing output data from said analog/digital conversion control means in response to the sixth control signal from said control logic means and outputting the third response signal to said control logic means through said internal control bus line upon completion of operation of the data processing means responsive to the sixth control signal, and serial communication control means for applying output data from said data processing means and the third control signal to said serial communication means in response to the seventh control signal from said control logic means, said serial communication control means outputting the fourth response signal to said control logic means through said internal control bus line upon completion of operation of the serial communication means responsive to the seventh control signal.

2. A data input/output control unit for a touch panel interface device, as set forth in claim 1, wherein said suspend mode setting means is adapted to output the suspend signal to said command signal generation means when no output signal from said data detection means is present, to change the present mode to the suspend mode.

3. A data input/output control unit for a touch panel interface device, as set forth in claim 1, wherein said suspend mode setting means includes:

a signal detector for detecting the output signal from said data detection means;

a timer for counting an output signal from said signal detector for a predetermined time period and outputting an eighth control signal in accordance with the counted result; and a suspend signal generator for outputting the suspend signal to said command signal generation means in response to the eighth control signal from said timer.

4. A data input/output control unit for a touch panel interface device, as set forth in claim 3, wherein said timer is adapted to output the eighth control signal to said suspend signal generator when no output signal from said signal detection means is present.

5. A data input/output control unit for a touch panel interface device, as set forth in claim 1, wherein said command signal generation means includes:

a status sensor for sensing a present status in response to the status signal from said control logic means and the suspend signal from said suspend mode setting means;

an operation controller for generating an eighth control signal and the status end signal in response to an output signal from said status sensor; and a command generator for outputting the command signal to said control logic means in response to the eighth control signal from said operation controller.

6. A data input/output control unit for a touch panel interface device, as set forth in claim 5, wherein said operation controller is adapted to output the status end signal to said control logic means upon its control operation completion.

7. A data input/output control unit for a touch panel interface device, as set forth in claim 5, wherein said command generator includes:

a counter for generating a ninth control signal in response to the eighth control signal from said operation controller;

a command data memory for storing command data in the form of a table and outputting the stored command data in response to the eighth control signal from said operation controller and the ninth control signal from said counter; and a decoder for decoding output data from said command data memory in response to the eighth control signal from said operation controller and outputting the resultant command signal to said control logic means.

8. A data input/output control unit for a touch panel interface device, as set forth in claim 1, wherein said control logic means includes:

a control signal distributor being enabled in response to the status end signal from said command signal generation means to analyze the command signal from said command signal generation means and generate eighth control signals and a ninth control signal in accordance with the analyzed result, said control signal distributor outputting the eighth control signals through said internal control bus line;

a response signal transfer device being enabled in response to the ninth control signal from said control signal distributor to input the first response signal from said switching control means, the second response signal from said analog/digital conversion control means, the third response signal from said data processing means and the fourth response signal from said serial communication control means through said internal control bus line and transfer the inputted first to fourth response signals; and a status signal generator for analyzing the first to fourth response signals transferred by said response signal transfer device and outputting the status signal to said command signal generation means in accordance with the analyzed result.

9. A data input/output control unit for a touch panel interface device, as set forth in claim 8, wherein said control signal distributor is adapted to output the eight control signals as the fourth to seventh control signals to said switching control means, said analog/digital conversion control means, said data processing means and said serial communication control means, respectively.

10. A data input/output control unit for a touch panel interface device, as set forth in claim 8, wherein said control signal distributor is adapted to output the ninth control signal to said response signal transfer device after outputting the eight control signals.

11. A data input/output control unit for a touch panel interface device, comprising:

a touch panel for sensing coordinates of a point touched by a user's stylus or pen and generating an analog signal in accordance with the sensed result;

data detection means for detecting input to said touch panel and generating an output signal;

system control means for controlling a system operation in response to the output signal from said data detection means;

switching means for turning supply power to said touch panel on and off in response to a first control signal from said system control means;

analog/digital conversion means for converting the analog signal from said touch panel into digital data in response to a second control signal from said system control means and outputting said digital data to said system control means; and serial communication means for performing a serial communication with other systems in response to a third control signal from said system control means;

wherein said system control means includes
suspend mode setting means for generating a suspend signal in response to the output signal from said data detection means to change a present mode to a suspend mode;

command signal generation means for generating a command signal in response to a status signal and said suspend signal to control the system operation;

control logic means for analyzing the command signal from said command signal generation means in response to a status end signal from said command signal generation means, said control logic means outputting the status signal to said command signal generation means;

switching control means for outputting the first control signal to said switching means and for then outputting a response signal to the control logic means;

analog/digital conversion control means for outputting the second control signal to said analog/digital conversion means, for inputting digital data from said analog/digital conversion means, and for then outputting a signal to said control logic means;

data processing means for processing output data from said analog/digital conversion control means and for then outputting a signal to said control logic means, and serial communication control means for applying output data from said data processing means and for then outputting a signal to said control logic means.

12. A data input/output control unit for a touch panel interface device including an analog/digital conversion means for converting analog signals from a touch panel which senses coordinates of a point touched by a user's pen and generates an analog signal in accordance with the sensed result, comprising:

data detection means for detecting input data to said touch panel and producing an output signal in response thereto;

system control means for detecting input data to said touch panel;

switching means for turning on/off supply power to said touch panel in response to a first control signal from said system control means;

wherein said system control means includes:
suspend mode setting means for generating a suspend signal in response to the output signal from said data detection means to change a present mode to a suspend mode;

command signal generation means for generating a command signal in response to a status signal and the suspend signal from said suspend mode setting means to control operation of a system operation;

control logic means for analyzing the command signal from said command signal generation means in response to a status end signal from said command signal generation means and outputting fourth to seventh control signals as a result of the analysis through an internal bus line, said control logic means inputting first through fourth response signals through said internal control bus line and outputting the status signal to said command signal generation means in response thereto; and switching control means for outputting the first control signal from said system control means to said switching means in response to the fourth control signal from said control logic means, said switching control means outputting the first response signal to said control logic means through said internal control bus line upon the completion of operation of said switching means.

13. The data input/output control unit for a touch panel interface device as set forth in claim 12, and further comprising:

analog/digital conversion means for converting the analog signals from said touch panel into digital data in response to a second control signal from said system control means, and for outputting the converted digital data to said system control means; and serial communication means for performing a serial communication with other systems in response to a third control signal from said system control means.

14. The data input/output control unit for a touch panel interface device as set forth in claim 12, wherein said system control means further comprises:

analog/digital conversion control means for outputting said second control signal from said system control means to said analog/digital conversion means in response to the fifth control signal from said control logic means and for inputting the digital data from said analog/digital conversion means, said analog/digital conversion control means outputting the second response signal to said control logic means through said internal control bus line upon completion of operation of the analog/digital conversion means responsive to the fifth control signal;

data processing means for processing output data from said analog/digital conversion means in response to the sixth control signal from said control logic means and for outputting the third response signal to said control logic means through said internal control bus line upon completion of operation of the analog/digital conversion means responsive to the sixth control signal; and serial communication control means for applying output data from said data processing means and the third control signal to said serial communication means in response to a fourth control signal from said control logic means, said serial communication control means outputting the fourth response signal to said control logic means through said internal control bus line upon completion of operation of the serial communication means responsive to the seventh control signal.

* * * * *